United States Patent [19]

Dar et al.

[11] Patent Number: 4,540,591

[45] Date of Patent: Sep. 10, 1985

[54] ROBUSTA COFFEE STEAMING, ROASTING AND BLENDING METHOD

[75] Inventors: Jamshed B. Dar, Robbinsville; Robert H. Bruckmann, East Windsor; Elisabeth Kelly, Bellemead, all of N.J.

[73] Assignee: General Foods Corporation, White Plains, N.Y.

[21] Appl. No.: 680,855

[22] Filed: Dec. 12, 1984

Related U.S. Application Data

[63] Continuation-in-part of Ser. No. 439,967, Nov. 8, 1982, abandoned.

[51] Int. Cl.³ ............................................. A23F 5/02
[52] U.S. Cl. ..................................... 426/388; 426/595; 426/447; 426/466; 426/467; 426/468; 426/469
[58] Field of Search ................................. 426/466–469, 426/388, 595, 447

[56] References Cited

U.S. PATENT DOCUMENTS

| | | | |
|---|---|---|---|
| 3,088,825 | 5/1963 | Topalian et al. | 426/447 |
| 3,106,470 | 10/1963 | Spotholz | 426/447 |
| 3,122,439 | 2/1964 | MacAllister et al. | 426/467 |
| 3,345,180 | 10/1967 | Smith | 426/467 X |
| 3,345,181 | 10/1967 | Smith | 426/467 X |
| 3,572,235 | 3/1971 | Nutting et al. | 99/470 |
| 3,595,668 | 7/1971 | Nutting et al. | 426/467 |
| 3,640,726 | 2/1972 | Bolt et al. | 426/467 X |
| 3,767,418 | 10/1973 | Ponzoni et al. | 426/466 X |
| 3,964,175 | 6/1976 | Swetz | 426/467 X |
| 4,349,573 | 9/1982 | Stefanucci | 426/388 |

*Primary Examiner*—Joseph Golian
*Attorney, Agent, or Firm*—Basam E. Nabulsi; Joseph T. Harcarik; Daniel J. Donovan

[57] ABSTRACT

A method of steaming, roasting and blending Robusta coffee beans is disclosed. The green Robusta beans are first contacted with steam under pressure in a vessel. The vessel is continuously vented at a pressure of between 1 psig and 5 psig. Next, the steamed Robusta beans may be either dried and subsequently roasted or roasted directly. Roasting in a bubbling bed or with steam under pressure is preferred so that heavy, roasted burnt notes are developed. The roasted Robusta coffee may then be blended with at least one type of roasted Arabica coffee.

8 Claims, No Drawings

ROBUSTA COFFEE STEAMING, ROASTING AND BLENDING METHOD

This is a continuation-in-part of Ser. No. 439,967, filed Nov. 8, 1982, now abandoned.

TECHNICAL FIELD

The present invention relates to a method of steaming, roasting and blending Robusta coffee to produce a coffee having increased extractability. More particularly, the invention involves steam treating the coffee, roasting the steamed coffee, and blending the coffee with higher grade coffee to produce a balanced flavored coffee having increased extractability.

BACKGROUND ART

Commercial roasted and ground coffees are typically comprised of the two coffee types, Arabicas which are comprised f Colombian Milds and Brazilians and the Robustas which are of lesser quality. The Arabicas are characterized by good, aromatic flavor notes and the typically less expensive Robustas are characterized as having bitter and rubbery flavor notes.

With the Robustas being less expensive and contributing balancing flavor notes, it is desirable to introduce a relatively high proportion of Robustas in a commercial blend of coffees, but the characteristic strong flavor notes limit the amount of Robustas that may be added. Typically, the amount of Robustas is limited to about 35% by weight of a commercial coffee blend. It is desirable to provide a method for increasing the proportion of Robusta coffees that may be added to a typical commercial coffee blend and, at the same time, provide a coffee having increased extractability.

Roasting techniques for altering the flavor and soluble solids yield of coffee are known. For example, U.S. Pat. No. 3,088,825 to Topalian et al. teaches a roasting cycle comprising pre-heating the coffee, roasting coffee with steam under pressure and suddenly releasing the pressure. Another patent, U.S. Pat. No. 3,106,470 to Spotholz et al. discloses a similar process operating at somewhat lower steam roasting pressures. Both disclosures point out that a coffee so steamed provides a brew of higher soluble solids content upon extraction. These techniques are useful for roasting coffee, particularly Robusta coffee, but brews prepared from the roasted coffee though having higher solids content, tend to be characterized as having high acid and sour notes.

A roasting method for producing a specially processed Robusta coffee is disclosed in U.S. Pat. No. 3,640,726 to Bolt et al. The Robusta coffee is first steamed in a confined vessel preferably for between 2.5 minutes and 6 minutes. The partially roasted coffee is then held for a period of time not exceeding 2 hours and subsequently conventionally roasted. The Robusta coffee so roasted is then blended with untreated roasted Robustas as well as roasted Arabicas. Treatment of the Robustas according to this method produces a coffee which has lessened off-flavor notes but is characterized as prune-like, acid and green apple (sweet-sour).

An apparatus for the continuous roasting of coffee is disclosed in U.S. Pat. No. 3,572,235 to Nutting et al. wherein the beans are first pre-heated with steam under pressure in a confined roasting vessel, and subsequently roasted in a fluidized bed apparatus. Specifically, the fluidized bed roasting described therein is limited to charging the beans to a gas impervious plate and impinging a heated gas on said plate to fluidize said beans. A process for roasting coffee in such an apparatus is disclosed in U.S. Pat. No. 3,595,668 also to Nutting et al. The process specifically requires fluidized bed roasting of the coffee after steaming.

Another disclosure, U.S. Pat. No. 4,349,573 to Stefanucci et al., describes a method of producing a low density roasted and ground coffee product which provides 20% more brewed coffee of equal quality than a conventionally roasted and ground coffee product. The coffee is roasted for shorter times at higher temperatures in conventional coffee roasting equipment. The 20% increase in the amount of brewed coffee produced is a significant advantage but a still further increase in the brewed coffee produced from a given weight of coffee (or, a reduction in the weight of coffee used to produce the same amount of brewed coffee) is at times desirable.

It is an object of the present invention to provide a method of roasting and blending Robusta coffee whereby a higher proportion of said Robusta coffee may be added to the blend without adversely affecting the flavor of the blend.

A further object of the present invention is to provide a method of roasting Robusta coffee which coffee has lessened characteristic strong flavor notes.

DISCLOSURE OF THE INVENTION

It has now been found that the objects of the invention are met by a method of steaming, roasting and blending Robusta coffee. The green Robusta beans are first contacted with steam under pressure. Next, the steamed Robusta beans may be either dried and subsequently roasted or roasted directly. The roasted Robusta coffee is then blended with at least one type of Arabica coffee.

Green Robusta coffee beans are first charged to a vessel wherein said beans may be contacted with steam. The vessel may be of any sort capable of withstanding elevated pressure. An elongated column has been found to be particularly convenient for steaming the Robusta coffee. The coffee beans are charged to the vessel so that between 50% and 75% of the volume of said vessel is occupied by the beans. The 25% to 50% of the vessel volume that is void space provides room for the expansion of the green beans during steaming and is believed to be necessary for the flavor improvement of the Robusta beans attributable to the steaming step.

Unlike prior art methods, the steaming step of the present invention is not carried out in an entirely confined vessel. The vessel of the present invention is continuously vented so as to vent off a small amount of gas and any condensed steam that may collect therein. Such venting permits the removal of any undesirable gases and any compounds that are generated by the Robusta beans as a result of said steaming. In addition, the loss of soluble solids from the coffee beans is minimized because the condensed steam or condensate which is formed is removed, thereby preventing the leaching and consequent loss of the soluble solids into the condensate.

The vent of the present invention further allows for the evacuation of any air pockets which exist within the steaming vessel. The steam enters the top of the vessel and acts to purge the air pockets downward. Said air pockets ultimately exit the steaming vessel as part of the vent stream. The removal of said air pockets thus uniquely unables a complete and uniform steaming of a static green bean load.

It has been found that when uniformly steamed green Robusta beans are roasted, they yield a uniform roast of improved quality lacking the undesirable tarry note characteristic of Robusta coffee. The steaming operation begins after the Robusta beans have been charged into the vessel. Steam, preferably saturated steam, is introduced into the vessel at a pressure between 7 atmospheres and 10 atmospheres and at a temperature between 166° C. and 180° C. The steam is introduced into the top of the vessel and flows downflow therethrough. The Robusta beans are contacted with the steam for from about 10 minutes to about 15 minutes, with a longer time being required when a lower temperature steam is used. For example, steaming is carried out for 15 minutes when 7 atmosphere saturated steam is used whereas steaming is carried out for only 10 minutes when saturated steam at 10 atmospheres pressure is used.

A vent steam continuously exits the bottom of the steaming vessel at a rate which is fast enough to allow suitable circulation of the steam within the steaming vessel, but not so fast that insufficient steam to bean contact occurs. By this it is meant that the vent rate is critically controlled to ensure proper circulation of the steam within and through the steaming vessel. At steady state, it has been found that a steaming vessel being operated at from 50-75% loading, between 7 and 10 atmospheres, and at 166° C. to 180° C., is properly vented such that the vent pressure is from 1 psig to 5 psig and preferably from 2 psig to 4 psig. As is readily apparent to one skilled in the art, steady state exists when the steaming vessel has attained its target pressure and venting has begun.

After the beans have been steamed at the conditions described above, said beans are discharged and, depending on the roasting technique selected, said beans may be dried prior to roasting. Drying of the steamed Robusta beans should be under nonroasting conditions. Convective drying in hot air at a temperature between about 38° C. and 20° C. has been found to be particularly convenient. The drying step should be carried out in less than about 3 hours so as to avoid damaging the flavor of the steamed Robusta coffee.

Steamed and preferably dried Robusta beans are then roasted. Any roasting technique which is known in the art may be employed. Two particularly suitable roasting techniques are "bubbling bed" and roasting with steam under pressure. Roasting the steamed beans of the present invention according to these two particularly suitable roasting methods enables a coffee brew to be prepared at a reduced recipe level which has approximately the same soluble solids as a brew prepared from conventionally roasted coffee. In one particularly advantageous embodiment, between 15% and 30% of the steamed and preferably roasted Robusta beans of the invention are blended with conventionally roasted coffee beans comprising at least one Arabica bean type, enabling about a 40% recipe reduction with comparable brew solids as compared to 100% conventionally roasted coffee. The invention is not, however, limited to these two roasting methods, but rather particularly advantageous results may be achieved by combining the novel steaming procedure of the invention with "bubbling bed" or steam under pressure roasting.

As a basis for comparison, conventional roasting refers to roasting in typically commercial equipment, such as a Thermalo roaster manufactured by Jabez Burns and Sons, Inc., wherein relatively low velocity roasting air contacts the coffee beans at inlet temperatures of between 370° C. and 560° C. The roasting air temperature is often lowered or modulated to within the range 340° C. to 530° C. toward the end of the roast. Flame time, that is, the time the roasting air is actually circulated in the roaster, is usually 10 to 12 minutes, with the total roasting cycle taking 15.5 to 17.5 minutes. The roasted coffee is typically quenched with water in order to terminate the roasting reaction.

The first roasting method which is particularly suitable for use in the present invention is roasting in a "bubbling bed" at about 232° C. to about 260° C. for a period of time less than about 5 minutes. A "bubbling bed" is essentially intermediate between a non-fluidized or static bed wherein virtually none of the beans are suspended in the roasting air and a fluidized bed wherein substantially all of the beans are suspended in the roasting air. In a bubbling bed, as used herein, the greater mass of coffee beans is suspended in the roasting air at any given time, with a smaller mass of beans being in a static bed. A bubbling bed is constantly circulating, with any given coffee bean being suspended for about 70% of the time. The suspended portion of the bubbling bed is maintained by flowing large volumes of roasting air upwardly through the bed at velocities greater than typically used in conventional roasters. For instance, the weight ratio of roasting air to coffee beans (the so-called air to bean ratio) is about 1/1 (kg roasting air/kg coffee) for a conventional roaster compared to an air to bean ratio between 40/1 and 60/1 for the bubbling bed roaster contemplated for use herein. The roasting air velocity in a bubbling bed roaster is on the order of 670 m/min. to 760 m/min., which is between that for a conventional roaster (40 m/min to 46 m/min) and that contemplated for a fluidized bed roaster (3660 m/min as indicated in U.S. Pat. No. 3,595,668 to Nutting et al).

The particular equipment used for bubbling bed roasting may of course be any which achieves the prescribed conditions. The bubbling bed roaster may be a batch roaster wherein the steamed coffee beans are placed in a perforated basket and loaded in the roaster. Roasting air, a combination of air and combustion gases from the roaster burner, is blown upwardly through the beans in the basket in the volume and at the temperature and velocity hereinabove indicated. When the roast has progressed for a sufficient period of time, typically after about 1.5 minutes to 2 minutes but in any event less than 5.0 minutes, the roasting air is shut off so that the beans are no longer heated. Alternatively, the roaster may be continuous wherein beans are continuously fed to a rotating perforated cylinder within the roaster. The roasting coffee beans are advanced through the roaster by a helical screw spanning the length of the cylinder. Roasting air is blown upwardly through the beans at the conditions hereinabove indicated. The residence time of the beans within the roaster is determined by the rate of rotation of the cylinder. Such a roaster provides agitation to the roasting coffee beans by maintaining the bubbling bed as well as mechanically agitating the entire bubbling bed by the action of the helical screw.

The second roasting technique particularly suited to the present invention, disclosed in U.S. Pat. No. 3,088,825 to Topalian et al., is roasting of the Robusta beans with steam under pressure. As hereinbefore indicated, roasting by the method of Topalian et al. produces a coffee characterized as having high acid and sour notes. It has now been found that roasting according to the present invention, that is, steaming the green beans prior to roasting with superheated steam under pressure, but with a continuous vent, substantially lessens the characteristic acid and sour notes in the roasted coffee. The Robusta beans which have been steamed as described herein are dried as hereinbefore detailed prior to roasting said beans with steam under pressure. The Robusta beans are then preheated at about 120° C. to 160° C. for about 5 minutes to 8 minutes. Preheating is most preferably carried out by forced convection with heated air. The purpose of the preheating step is to prevent condensation of the superheated steam in the subsequent steam roasting step.

The preheated Robusta beans are then roasted in superheated steam at a pressure between 11 atmospheres and 18 atmospheres for between 2 minutes and 8 minutes. The steam roasting is carried out in a pressure vessel, most preferably an elongated column. The roasted Robusta beans are then rapidly discharged from the roaster in less than about 30 seconds so that the beans expand or puff, thereby decreasing the density of the roasted coffee. Roasting according to this technique provides Robusta coffee substantially lacking in undesirable flavor notes, but which coffee gives a higher soluble solids yield upon extraction, permitting a reduction of up to 40% of the weight of conventionally roasted coffee needed to obtain a brew of equal strength. Moreover, because the density of the roasted coffee is decreased, the lesser weight of coffee occupies roughly the same volume as the conventionally roasted coffee, permitting the consumer to use the same volume of coffee as normaly used in preparing the brew.

The Robusta coffee roasted according to either preferred embodiment of the present invention is then blended with at least one type of roasted Arabica coffee such as Colombian Milds. More typically, said Robusta coffee is blended with the two Arabicas, Milds and Brazilians, as well as with a proportion of untreated Robustas. While untreated Robustas are typicaly limited to blending at about 35% by weight, Robustas roasted according to the present invention may be blended at 30% by weight together with untreated Robustas at about 20% by weight with no adverse flavor impact. Robusta coffee roasted according to the method of the present invention should be blended at at least 15% by weight to gain some of the advantages of the invention. The benefits of the Robusta coffee roasted according to the "bubbling bed" and Topalian et al. methods, such as the increased solids yield and the decreased density, carry through to the blend so that the blend may be used at a 40% reduced recipe to provide a brew of approximately the same soluble solid strength, with improved flavor balance due to the novel steaming process of the invention.

The following examples are intended to illustrate certain embodiments of the present invention. The examples are not intended to limit the invention beyond what is claimed below.

EXAMPLE 1

1. A portion of green Indonesian Robusta coffee beans was loaded in an elongated column about 4.6 m in height. Approximately 25% to 50% of the column was void space. The column was sealed except for a drain at the bottom of the column. Saturated steam at 7 atmospheres absolute pressure was introduced at the top of the column and forced downward through the coffee beans. The drain drained off any condensate that formed as well as vented a small portion of the steam, with the vent steam measuring approximately 2 psig. The steam was introduced into the column for about 15 minutes whereupon the steam supply was shut off and the beans nearly instantly discharged from the column by opening a large ball valve on the bottom of the column.

2. The steamed coffee beans were collected and placed in a tray dryer. The beans were heated in air at 93° C. for 2 hours in order to dry them to less than about 5% by weight moisture.

3. The dried coffee beans were then charged to the roaster and heated convectively with air at 163° C. for 8 minutes. The preheated beans were then charged to the roaster pressure vessel and the vessel was sealed. Superheated steam was introduced into the pressure vessel at a pressure of 13 atmospheres and a temperature of 232° C. for 2 minutes 20 seconds. The roasted beans were rapidly discharged from the roaster by opening a ball valve on the pressure vessel. The roasted Robusta coffee beans were allowed to cool in the air to ambient temperature.

4. Individual strains of Colombian beans, Brazilian beans and Ivory Coast Robustas were roasted in a Thermalo roaster at about 665° C. for 12 minutes. The beans were quenched with water on discharge in order to cool the beans.

5. A blend was prepared as follows:

| Type | % of blend by weight |
| --- | --- |
| Steamed, dried & steam roasted Robustas | 30% |
| Conventionally roasted Colombians | 37% |
| Conventionally roasted Brazilians | 13% |
| Conventionally roasted Robustas | 20% |

The blend was then ground to an average particle size of about 600$\mu$.

6. A typically commercial blend of 51% Colombians, 15% Brazilians and 34% Robustas was prepared and roasted conventionally at about 665° C. for 12 minutes as a control. The roasted blend was then ground to an average particle size of about 800 $\mu$. Though the blend of step 5 was ground to an average particle size of 600$\mu$ in order to increase extractability of the blend, it has been found that the control blend is most preferably ground to 800$\mu$ and that grinding said blend to an average particle size of 600$\mu$ does not appreciably increase extractability.

7. A brew was prepared of the control at a recipe of 63 gm of the blend/1780 ml of water in a drip coffee brewer. A brew was prepared of the blend of this invention at a 40% reduced recipe level of 38 gm of the blend/1780 ml of water in the drip coffee brewer. The control brew had a soluble solids concentration of 0.74% by weight and the brew made from the blend of this invention had a soluble solids concentration of 0.69% by weight, a 7% reduction of soluble solids as compared to the 40% recipe reduction. Moreover, the flavor impact of the brew prepared from the blend of the instant invention was judged to be equivalent to the control brew in random consumer sampling.

So, the blend of the instant invention had a higher Robusta content (50% by weight vs. 34% for the control) and was prepared at a 40% reduced recipe yet was judged equivalent to the control brew in random sampling.

EXAMPLE 2

1. A portion of green Robusta coffee was steamed as described in step 1 of Example 1.

2. The steamed coffee beans were placed in a tray dryer and heated in air at 93° C. for 2 hours in order to dry them to about 5% by weight moisture.

3. The dried coffee beans were placed in a "V" shaped perforated basket and placed in a batch Ross Dryer manufactured by Midland-Ross Co. of New Brunswick, N.J. Roasting air was blown upwards through the basket, suspending the beans in a bubbling bed. The roasting air temperature was maintained between 252° C. to 274° C. and the roasting time was about 2 minutes. After the roast, the perforated basket was removed from the dryer, allowing the roasted coffee beans to cool in ambient air.

4. A portion of unsteamed Colombian beans was roasted conventionally at about 665° C. for 12 minutes. The beans were quenched with water on discharge.

5. A blend of 75% by weight conventionally roasted Colombians and 25% by weight steamed, dried and bubbling bed roasted Robustas was prepared. The blend was ground to an average particle size of 600μ.

6. A first control blend of 75% by weight Colombians and 25% Robustas was prepared by conventionally roasting the Colombian beans; steaming the Robusta beans as described in step 1 of Example 1 and conventionally roasting said beans; and blending the Colombian and Robusta beans. The blend was ground to an average particle size of 600μ.

7. A second control blend was prepared as in step 7 of Example 1.

8. Brews were prepared at the following recipes:
(a) 38 gm/1780 ml for the blend of this example;
(b) 38 gm/1780 ml for the first control blend;
(c) 63 gm/1780 ml for the second control blend.

The brew of the first control blend was judged weak and thin in comparison to the brew prepared from the blend of this invention. Moreover, the brew prepared from the blend of this invention was judged equivalent to the brew of the second control blend prepared at the higher recipe. All flavor judgments were by an expert panel.

EXAMPLE 3

1. Green Indonesian Robusta coffee beans were loaded into the elongated steaming column of Example 1. Approximately 25% to 50% of the column was void space. The column was entirely sealed, i.e., no vent provided at the bottom. Saturated steam at 90 psig was introduced at the top of the column until a pressure of 90 psig existed in the column, then the column was sealed. After 15 minutes, the beans were nearly instantaneously discharged by opening a large ball valve on the bottom of the column. Visual observation of the steamed beans was made.

2. The procedure of step 1 was repeated with fresh green Robusta coffee 7 times, but with a vent steam continuously exiting the bottom of the column. In each repetition, the vent steam pressure was increased by 1 psig, from 1 psig to 7 psig. The visual observations for the eight test runs are summarized in the table.

TABLE

| Run # | Column Pressure (psig) | Vent Pressure (psig) | Residence Time (min.) | Observations |
|---|---|---|---|---|
| 1 | 90 | 0 | 15 | Major portion of the batch was green beans, some were dark beans. This indicates very little circulation of steam inside the column. |
| 2 | 90 | 1 | 15 | The batch was a mixture of green and dark beans, indicating some circulation of the steam inside the column. |
| 3 | 90 | 2 | 15 | Major portion of the batch was dark beans some were green beans. This indicates an increased circulation of the steam inside the column. |
| 4 | 90 | 3 | 15 | All dark beans, uniform color distribution. This indicates an adequate distribution/flow of the steam through the bean bed inside the column. Uniformity steamed beans produce uniform roasts. |
| 5 | 90 | 4 | 15 | Major portion of the batch was dark beans, some were green beans. Indicating a faster circulation of the steam as observed above (3 psig vent pressure). |
| 6 | 90 | 5 | 15 | Mixture of dark and green beans indicating an even faster circulation of steam as observed above (4 psig vent pressure). |
| 7 | 90 | 6 | 15 | Major portion of the batch was green, indicating a steam sweep through the packed column, in proper contact between steam and beans. |
| 8 | 90 | 7 | 15 | Almost all green. Too fast circulation of the steam, very little contact of steam and beans. |

These results demonstrate the unique improvement to the art achieved by steaming green beans with a continuous vent at an exit pressure of between 1 psig and 5 psig, and preferably between 2 psig and 4 psig, according to the present invention.

What is claimed is:

1. A method of treating Robusta coffee beans which comprises:
(a) charging an elongated column vessel with green Robusta coffee beans wherein 50% to 75% of the volume of the vessel is occupied by the beans;
(b) introducing saturated steam into the top of said vessel at a pressure between 7 atmospheres and 10 atmospheres and at a temperature between 166° C. and 180° C. for from 10 min. to 15 min. while continuously venting said vessel at the exit end and at an exit pressure of between 1 psig and 5 psig;

(c) discharging the steamed Robusta beans from said vessel and;

(d) roasting said steamed Robusta beans.

2. A method as in claim 1 which further comprises: drying the steamed Robusta beans prior to roasting.

3. A method as in claim 2 wherein the steamed Robusta beans are dried in air at between about 38° C. and 120° C. for less than about 2 hours.

4. A method as in claim 1 wherein said vessel is vented in step 1(b) at an exit pressure of between 2 psig and 4 psig.

5. A method as in claim 1 wherein the roasting of the steamed Robusta beans is in a bubbling bed with roasting air at a temperature between 232° C. and 260° C. for less than about 5 min.

6. A method as in claim 2 which further comprises:
charging the steamed Robusta beans into a roaster;
roasting the steamed Robusta beans in a bubbling bed with roasting air at a temperature between 232° C. and 260° C. for less than about 5 min.; and
discharging the roasted Robusta beans from the roaster.

7. A method as in claim 1 further comprising:
drying the steamed Robusta beans in air at least 93° C. for less than about 2 hours;
charging the steamed Robusta beans into a roaster;
roasting the steamed Robusta beans by:
  (i) heating said beans at about 120° C. to 160° C. for 5 minutes to about 8 minutes;
  (ii) contacting the beans with superheated steam at a pressure between 11 atmospheres and 18 atmospheres and at a temperature between 177° C. and 246° C. for from about 2 min. to about 8 min.; and
  (iii) subsequently rapidly discharging the beans from the roaster in less than about 30 sec. so that the roasted Robusta beans are puffed; and
discharging the roasted Robusta beans from the roaster.

8. A method as in claim 5 further comprising:
blending said roasted Robusta beans at between 15% by weight and 30% by weight of the blend, which blend comprises at least one type of roasted Arabica beans, thereby enabling a 40% reduction in recipe level as compared to conventionally roasted coffee with approximately equivalent brew solids delivered.

* * * * *